United States Patent
Low et al.

[15] 3,670,241
[45] June 13, 1972

[54] AUDIO FREQUENCY MARKER SYSTEM

[72] Inventors: George M. Low, Acting Administrator of the National Aeronautics and Space Administration with respect to an invention of; Edward A. Cohen, 1021 Scripps Drive, Claremont, Calif. 91711; Stanley L. Manatt, 358 San Juan Way, LaCanada, Calif. 91011

[22] Filed: Aug. 11, 1970

[21] Appl. No.: 63,195

[52] U.S. Cl. .................................324/79 R, 328/189, 331/44
[51] Int. Cl. .......................................................G01r 23/14
[58] Field of Search ...............324/79, 77 B; 328/189; 331/44

[56] References Cited

UNITED STATES PATENTS 2,902,648  9/1959  Langford et al. ..........................324/79
2,588,730  3/1952  Johnson.................................324/79

*Primary Examiner*—Alfred E. Smith
*Attorney*—J. H. Warden, Paul F. McCaul and John R. Manning

[57] ABSTRACT

A system for providing a precise temporal display, or record, of the frequencies through which a sweeping audio frequency signal is swept, is disclosed. A sweeping audio frequency signal, of which the exact frequency with respect to time is unknown, is applied as an input to a pulse generator for the purpose of generating a train of pulses having a pulse repetition rate which is the same as the frequency of the applied signals. The train of pulses is applied to a mixer circuit for the purpose of being mixed with a signal having a known frequency with respect to time. The beat frequency signals generated by the mixer circuit are applied to an appropriate display device, such as a chart recorder, for the purpose of providing the desired display or record.

13 Claims, 3 Drawing Figures

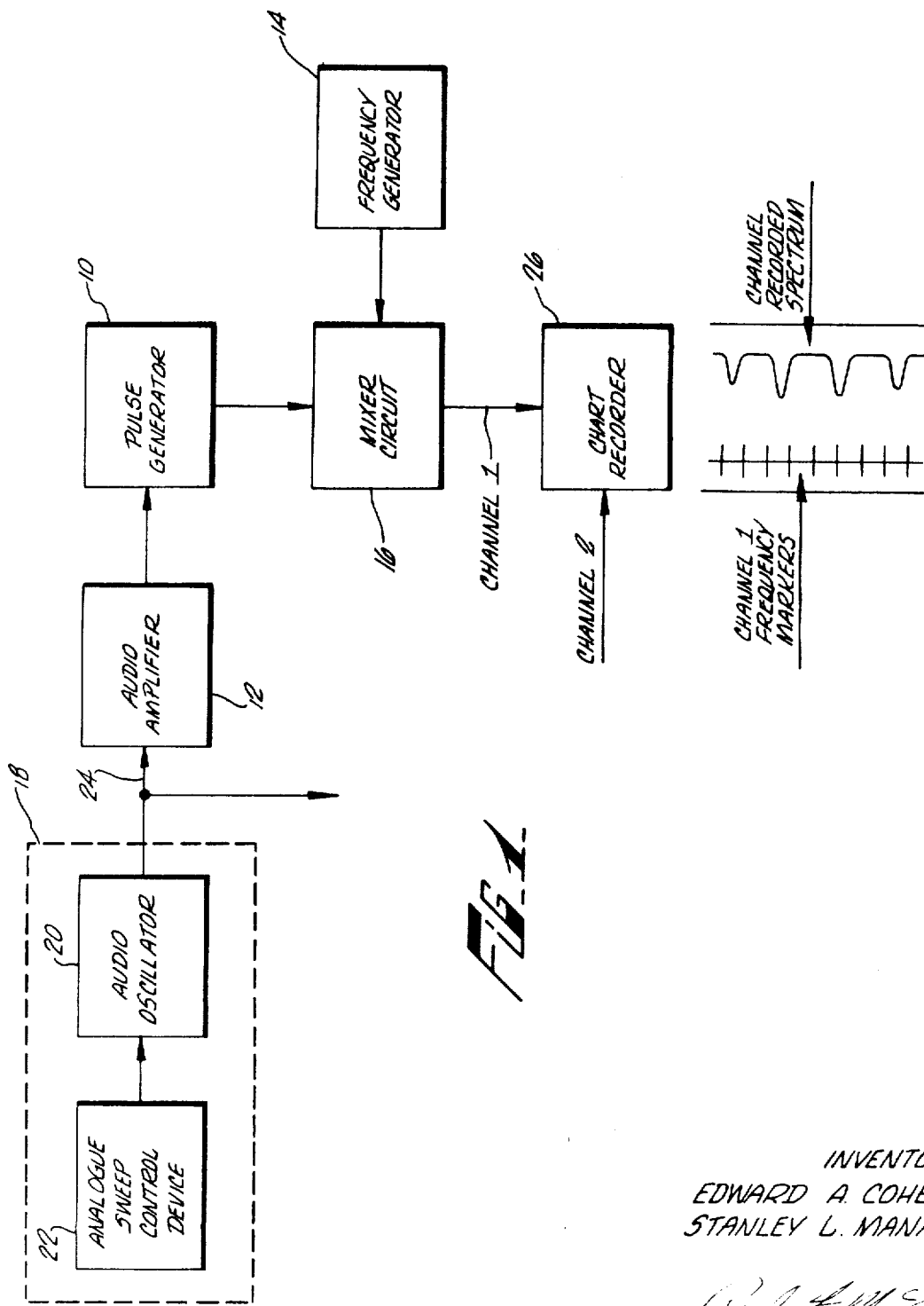

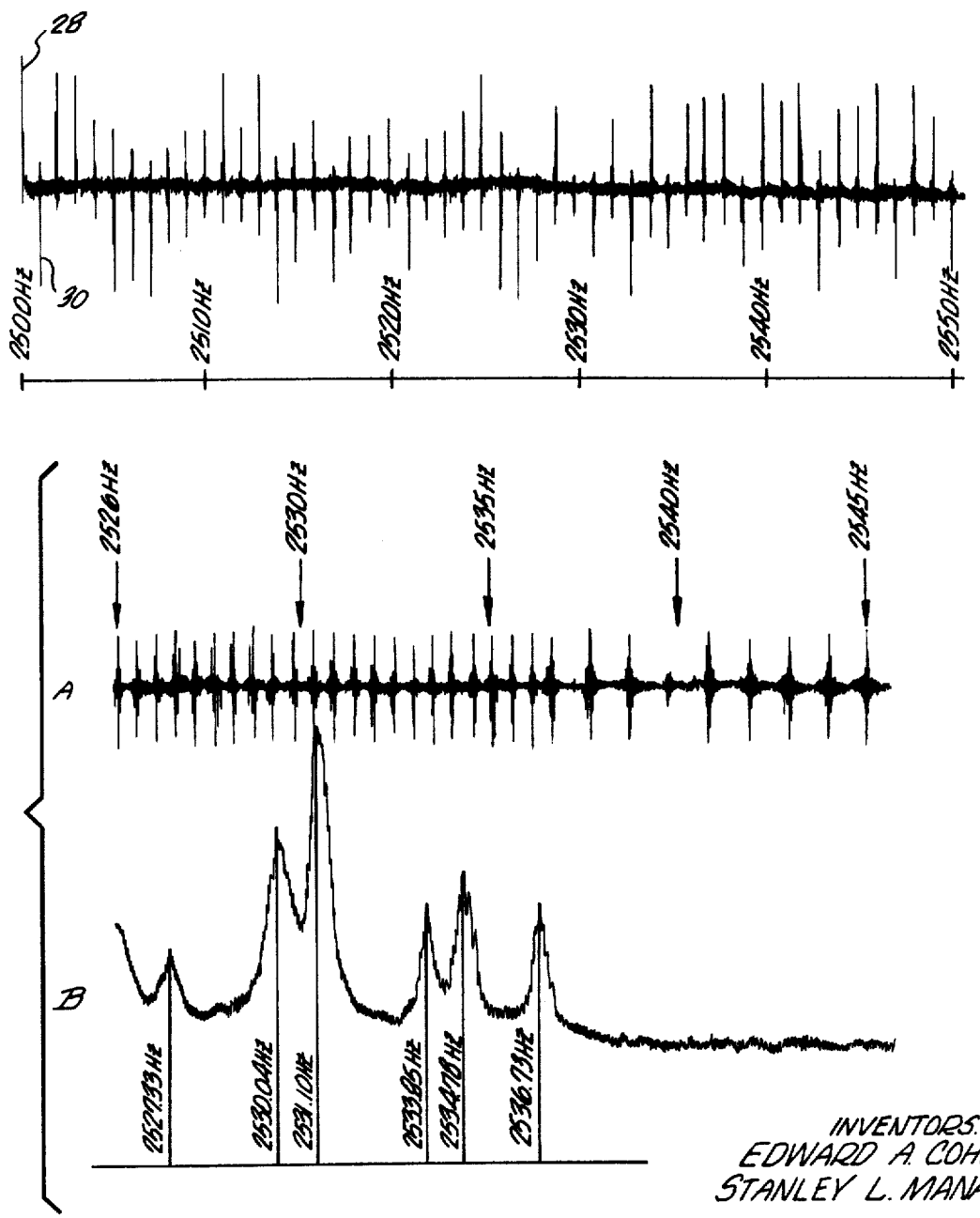

AUDIO FREQUENCY MARKER SYSTEM

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2,457).

BACKGROUND OF THE INVENTION

1. Field of the Invention

This invention generally relates to devices for determining and displaying or recording the instantaneous frequency of a sweeping signal generator. More specifically, the present invention concerns a system for providing a temporal record of the frequencies through which a sweeping audio frequency signal is swept with respect to time.

2. Description of the Prior Art

Sweeping audio frequency signals are employed in conducting many experiments. A typical example of such experiments is high-resolution nuclear magnetic resonance spectroscopy wherein a sweeping audio frequency is employed to obtain a chart, record, or other display of the nuclear magnetic resonance absorption lines. It is important in such experiments to be readily able to identify the resonant frequencies of the respective absorption lines, preferably in the process of recording the respective absorption lines. Due to the nature and precision of such experiments, this has been heretofore possible only where an extremely stable sweeping frequency source is available. As an example, the sweeping audio oscillator, or other signal source, employed in an experimental set up, should have a typical stability in frequency and sweep rate linearity of one part in $10^5$ for the frequency range of 500–3,500 Hz and about one part in $10^6$ for the frequency range of 3,500–10,000 Hz.

Frequency stability is able to be obtained by using currently available techniques and components. However, stability in sweep rate linearity, or frequency-time synchronism, is not as readily obtainable.

Ordinarily, such frequency sweeps are produced by using analogue techniques wherein a resistance element or voltage source is changed at a constant rate with respect to time. Ordinarily, it is possible to make extremely linear changes of resistance elements or voltage sources by using a simple analogue device. Nevertheless, the above mentioned degree of stability in sweep rate linearity has not been readily obtainable, the required stability being missed by several orders of magnitude when standard analogue techniques are used.

Typically, the resonant frequencies of absorption lines obtained in nuclear magnetic resonance spectroscopy have in the past been necessarily ascertained by the extraordinarily time-consuming method of employing a frequency counter to count the audio frequencies, of a sweeping audio frequency signal, both before and after the observation of a spectrum. A number of readings or sets of data are customarily taken for the purpose of providing frequency data which can be mathematically averaged. As is well known by those persons skilled in the art, this technique is for the most part unacceptable and certainly does not enable a precise calibration of the spectra, or identification of the resonant frequencies, during the recordation process.

An obvious alternative to using a simple sweep oscillator which is controlled by an analogue device, is to use a digital-sweep programmer in conjunction with a frequency synthesizer. The attendant complexity and extremely high cost of digital equipment, however, makes the use of such equipment highly impractical. Generally stated, there is no technique or apparatus that will enable experimenters to readily establish precise sweep calibrations for both frequency and magnetic field sweep spectra.

It is therefore the intention of the present invention to provide a technique, and associated apparatus, which may be readily employed in conjunction with currently available research and testing equipment to simultaneously record a series of audio frequency markers during the recordation of a spectrum.

OBJECTS AND SUMMARY OF THE INVENTION

Accordingly, it is an object of the present invention to provide a technique, and associated apparatus, for developing a temporal display of the audio frequencies generated by a sweeping signal source.

It is another object of the present invention to provide an audio frequency marker system that enables the simultaneous recordation of spectra and frequency markers for calibrating such spectra.

It is a further object of the present invention to provide an audio frequency marker system that may be readily employed with conventional test equipment including a standard analogue-controlled sweep oscillator.

It is a yet further object of the present invention to provide an audio frequency marker system that will easily satisfy current stability requirements at nominal cost.

Briefly described, the present invention involves a system for producing precise audio frequency markers by recording beat frequency signals that are generated by mixing a sweeping signal of relatively unknown frequency with a signal having a series of known, very stable frequencies which are harmonically related to the relatively unknown frequency.

More particularly, the subject audio frequency marker system includes a pulse generator for generating a train of pulses in response to the application thereto of a sweeping audio frequency signal. The pulses have a repetition rate that is equal to the frequency of the applied signal. A highly stable frequency generator is stepped to provide a signal having a series of known frequencies and which is mixed with the train of pulses to obtain beat frequency signals. These beat frequency signals, when recorded, serve to incrementally identify the frequencies through which a sweeping audio frequency signal is swept.

BRIEF DESCRIPTION OF THE DRAWINGS

FIG. 1 is a functional block diagram illustrating an audio frequency marker system in accordance with the present invention.

FIG. 2 is a graphic diagram illustrating a series of audio frequency markers that may be provided in accordance with the present invention.

FIG. 3 is a graphic diagram illustrating an exemplary chart that may be produced by employing a dual channel recorder in conjunction with the present invention.

DESCRIPTION OF THE PREFERRED EMBODIMENT

Referring to FIG. 1 of the drawings, an audio frequency marker system in accordance with the present invention may include a pulse generator 10, an audio amplifier 12, a stable frequency generator 14, and a mixer circuit 16.

A sweeping audio frequency signal, the frequencies of which are to be detected and marked with respect to time, may be provided by a conventional sweep oscillator arrangement 18. Such a sweep oscillator arrangement 18 is typically included in test equipment such as a nuclear magnetic resonance spectrometer and may include an audio oscillator 20 and an analogue sweep control device 22.

As is conventional, the analogue sweep control device may be an appropriate resistor, or voltage source, which is adapted to be varied with respect to time for the purpose of varying the output frequency of the audio oscillator. Notably, such analogue control devices, although capable of extremely linear adjustments, are incapable of providing the necessary degree of stability in sweep rate linearity. As a consequence, the exact instantaneous frequencies of the sweeping signal, with respect to time, are considered to be unknown.

As shown, the swept audio frequency signal generated at an output terminal 24 of the audio oscillator 20 is applied to the pulse generator 10 through an audio amplifier 12.

The pulse generator 10 serves to generate a train of pulses in response to the audio frequency signals applied thereto. It is intended that the train of pulses have a pulse repetition rate that is continually equal to the instantaneous frequency of the applied signals. As such, the pulse repetition rate of the pulsed signal provided by the pulse generator 10 will change in synchronism with the sweeping audio frequency signal generated by the audio oscillator 20. Any standard pulse generator that is readily available in the prior art, such as the Model PB-2 and the Model 121, manufactured by the Berkeley Nucleonics Company, may be used.

Customarily, available pulse generators have trigger input terminals that are characterized by a low input impedance. In some instances, this low input impedance will result in the sweeping audio frequency being pulled and/or distorted when the signal generated by the audio oscillator 20 is directly applied to the pulse generator 10. It has been found that the inclusion of an audio amplifier 12, for amplifying the sweeping audio frequency signal, serves to eliminate any such distortion of the sweeping audio frequency signal provided at the output terminal 24 of the audio oscillator 20. Elimination of any such distortion is particularly important where the sweeping audio oscillator arrangement 18 is used for other test purposes. In such cases where there is an acceptable impedance match between the output terminal of the audio oscillator 20 and the pulse generator 10, the use of an audio oscillator 12 may be unnecessary.

The pulsed signals provided by the pulse generator 10 are applied to a standard non-linear mixer circuit 16, such as the Model 10514A, Double Balanced Mixer, manufactured by Hewlett-Packard.

As is well known to persons skilled in the art, if two signals of nearly the same frequencies are mixed, beat frequencies will be generated, a zero beat occurring whenever the two frequencies are identical or are related harmonics. As such, a signal having a known, very stable frequency which is set at a high harmonic of an audio frequency expected to be generated by the audio oscillator 20, is also applied to the mixer circuit 16 for the purpose of generating a beat frequency. Any of the readily available and highly stable frequency generators may be employed as a stable frequency source. As an example, a Hewlett-Packard Model 5100A Frequency Synthesizer may be used.

When applied to and recorded by a chart recorder 26 having an appropriate time constant, such as a Moseley Model 7100A Dual Channel Recorder, the beat frequencies generated by the mixer circuit 16 can be recorded to provide a series of frequency markers which serve to precisely indicate the audio frequencies through which a signal is swept with respect to time.

A series of audio frequency markers are developed, as illustrated by FIG. 2, by sequentially stepping or advancing the frequency of the frequency generator 14 after each beat frequency is obtained. This stepping is able to be done manually or by any other appropriate technique in that the sweep rate of the sweeping audio frequency is customarily very slow. As an example, a typical sweep rate used in nuclear magnetic resonance spectroscopy would be 0.005 Hz per second or 50 Hz per 10,000 seconds.

Considering FIG. 2 in greater detail, the illustrated waveform represents a series of frequency markers that were actually obtained on a single channel X-Y recorder for a sweep range of 50 Hz. The frequency generator 14 was sequentially set at the 100th harmonic of the respective audio frequencies included in the sweep range. Specifically, the frequency generator was first set at 250 KHz. The initial audio frequency of the audio oscillator 20 was less than 2,500 Hz. Upon the sweeping frequency signal reaching 2,500 Hz, the first beat frequency, recorded as the frequency marker 28, was obtained. The frequency generator 14 was then stepped to 250.1 KHz. Upon the sweeping frequency reaching 2,501 KHz, the beat frequency, recorded as frequency marker 30 was obtained. The frequency generator 14 was subsequently sequentially stepped through the remainder of the sweep range to obtain the following frequency markers.

From the foregoing, it is clear that any number of frequency markers may be obtained by appropriately stepping the frequency of the frequency generator 14. Additionally, since the instantaneous frequencies of the sweeping audio frequency signal are marked, the requirement that the sweep rate be linear becomes of no importance for purposes of calibration.

It has been found that the sharpness of the frequency marker pattern is a function of the frequency at which the frequency generator 14 is set. For example, where a lower harmonic is used, the frequency marker pattern is less sharp.

Referring now to FIG. 3, a portion of the fluorine-19 spectrum of pentafluorophenol, which was recorded on a dual channel recorder 26 along with a series of frequency markers, is illustrated. Waveform A represents a series of frequency markers that were recorded on a first channel of the recorder 26. Waveform B represents the recorded fluorine-19 spectrum wherein the peaks represent nuclear magnetic resonance absorption lines. Notably, the frequency markers corresponding to audio frequencies below 2,537 Hz are provided at 0.5 Hz increments while frequency markers corresponding to higher frequencies were provided at 1.0 Hz increments.

In that the sweeping audio frequency signals are used for both the production of frequency markers and for the spectroscopy experiment, a direct and precise temporal relationship is established, on the recording, between each of the frequency markers and portions of the recorded spectrum. It thus becomes a simple matter to determine the frequencies of the respective absorption lines or any other aspect of the spectrum. Notably, as earlier mentioned, since a temporal relationship exists between the recorded waveforms, the requirement of sweep rate linearity is of no importance for calibration.

Referring once again to FIG. 1, the chart illustrated by FIG. 3 would have been produced by applying the beat frequencies from the mixer circuit 16 and the spectrometer output signals to channel 1 and 2, respectively, of a dual channel recorder 26.

It is to be noted that any other utilization or display device may be employed as a substitute for the dual channel recorder 26. For example, a dual channel oscilloscope may be employed. Further, single channel devices may be employed to provide, for example, a single display wherein a spectrum and a frequency marker pattern are superimposed.

It is to be noted that although the present invention has been described in conjunction with a nuclear magnetic resonance spectrometer, that it is intended that an audio frequency marker system, in accordance with the present invention, may be used to provide frequency calibration for any other experimental set up employing sweeping audio frequency signals. As an example, the present invention may be readily used in conjunction with test facilities designed to determine the effects of audio frequencies on structural members.

From the foregoing, it is now clear that the present invention provides a simple and inexpensive technique for establishing the frequency of recorded responses of a spectrometer, or other recorded waveforms, which technique is inexpensive, accurate and readily employable with commercially available equipment.

What is claimed is:

1. A frequency marker marker system for providing a display of frequency marker pulses that are temporally correlated to selected instantaneous frequencies of a sweeping audio frequency signal, said system comprising:

pulsing means for providing a series of pulses in response to the application of said sweeping audio frequency signal, said pulses having a repetition rate equal to the instantaneous frequency signal;

generator means for providing a beating signal having a stable frequency that is successively set at a high harmonic of each of said selected instantaneous frequencies;

mixer means, operatively coupled to receive said pulses from said pulsing means and to receive said beating signals from said generator means, for providing beat frequency signals that correspond to said selected instantaneous frequencies, said beat frequency signals occuring as said sweeping audio frequency signal is swept through the selected instantaneous frequencies for which said beating signal is successively set; and utilization means, operatively coupled to receive said frequency signals from said mixer means, for producing said display of frequency marker pulses which respectively correspond to said selected instantaneous frequencies, said frequency marker pulses being provided at the successive times at which said sweeping audio frequency signal is swept through said selected frequencies.

2. The apparatus defined by claim 1 further including sweeping means for generating said sweeping audio frequency signal, said sweeping means including:

an audio oscillator; and analogue means for controlling the rate at which said sweeping audio frequency signal is swept.

3. The apparatus defined by claim 1 further including an audio amplifier for applying said sweeping audio frequency signal to said pulsing means.

4. The apparatus defined by claim 1 wherein said pulsing means comprises a pulse generator adapted to generate a series of pulses having a pulse repetition rate that is equal to the frequency of signals applied thereto.

5. The apparatus defined by claim 1 wherein said mixer means is a balanced non-linear mixer.

6. The apparatus defined by claim 1 wherein said generator means comprises a frequency synthesizer for generating said beating signals, said frequency synthesizer being successively stepped for the purpose of incrementally changing the frequency of said beating signal to a high harmonic of different successive ones of said selected instantaneous frequencies, the frequency of said beating signal being changed to a high harmonic corresponding to the selected instantaneous frequency through which said audio frequency signal is to be next swept after the frequency marker pulse for the last selected instantaneous frequency has been provided.

7. The apparatus defined by claim 6 further including sweeping means for generating said sweeping audio frequency signal, said sweeping means including:

an audio oscillator; and analogue means for controlling the rate at which said sweeping audio frequency signal is swept.

8. The apparatus defined by claim 7 further including an audio amplifier for applying said sweeping audio frequency signal to said pulsing means.

9. The apparatus defined by claim 8 wherein said pulsing means comprises a pulse generator adapted to generate a series of pulses having a pulse repetition rate that is equal to the frequency of signals applied thereto.

10. The apparatus defined by claim 9 wherein said mixer means is a balanced non-linear mixer.

11. The apparatus defined by claims 10 wherein said sweeping audio frequency signal is simultaneously employed in an experiment requiring frequency sweeps, said utilization means including an oscilloscope adapted to display both said beat frequencies and data developed in said experiment.

12. The apparatus defined by claims 10 wherein said sweeping audio frequency signal is simultaneously employed in an experiment requiring frequency sweeps, said utilization means including a dual channel recorder adapted to record said beat frequency signals on a first channel and to record data developed in said experiment on a second channel.

13. A process for providing a temporal display of marker pulses corresponding to selected instantaneous frequencies through which a sweeping audio frequency signal is swept, said marker pulses being successively generated as said audio frequency signal is swept through said selected instantaneous frequencies, said process comprising the steps of:

generating a train of pulses having an instantaneous pulse repetition rate equal to the instantaneous frequencies through which said sweeping audio frequency signal is swept.

mixing said train of pulses with a beating signal having a frequency that is successively set at a high harmonic of said selected instantaneous frequencies to develop a succession of beat frequency signals, the frequency of said beating signal being successively reset at the next higher selected instantaneous frequency after each marker pulse is generated; and applying said succession of beat frequency signals to a display device to develop said temporal display of marker pulses.

* * * * *